(12) United States Patent
Chou

(10) Patent No.: US 9,016,740 B2
(45) Date of Patent: Apr. 28, 2015

(54) VACUUM-LIFTING DEVICE

(71) Applicant: Zhongshan Innocloud Intellectual Property Services Co., Ltd., Zhongshan, Guangdong (CN)

(72) Inventor: Yun-Yu Chou, New Taipei (TW)

(73) Assignee: Zhongshan Innocloud Intellectual Property Services Co., Ltd., Zhongshan (CN)

(*) Notice: Subject to any disclaimer, the term of this patent is extended or adjusted under 35 U.S.C. 154(b) by 0 days.

(21) Appl. No.: 14/471,282

(22) Filed: Aug. 28, 2014

(65) Prior Publication Data

US 2015/0061308 A1 Mar. 5, 2015

(30) Foreign Application Priority Data

Aug. 30, 2013 (TW) .............................. 102131192 A

(51) Int. Cl.
*B66C 1/02* (2006.01)
*B25J 15/06* (2006.01)

(52) U.S. Cl.
CPC .................................. *B25J 15/0616* (2013.01)

(58) Field of Classification Search
CPC ................................ B66C 1/0237; B66C 1/02
USPC ........................... 294/65, 183, 67, 67.1, 81.2
See application file for complete search history.

(56) References Cited

U.S. PATENT DOCUMENTS

| 1,110,409 | A | * | 9/1914 | Sutherland, Jr. | 294/65 |
| 5,988,718 | A | * | 11/1999 | Sugimoto et al. | 294/65 |
| 6,042,165 | A | * | 3/2000 | Thompson | 294/67.32 |
| 6,454,334 | B2 | * | 9/2002 | Massow | 294/65 |
| 8,622,449 | B1 | * | 1/2014 | Stroh | 294/67.3 |

* cited by examiner

*Primary Examiner* — Saul Rodriguez
*Assistant Examiner* — Gabriela Puig
(74) *Attorney, Agent, or Firm* — Novak Druce Connolly Bove + Quigg LLP

(57) ABSTRACT

A vacuum-lifting device of variable configurations includes a first slat element, a second slat element, and four suction members. The first slat element is detachably fixed to the second slat element, and the first slat element intersects with the second slat element defining an intersection. A first slot is defined in the first slat element and a second slot is defined in the second slat element. Two of the four suction members are translatably secured in the first slot. The other two of the four suction members are translatably secured in the second slot.

8 Claims, 5 Drawing Sheets

VACUUM-LIFTING DEVICE

FIELD

The subject matter herein generally relates to handling during manufacture.

BACKGROUND

In a process of manufacturing an optical element, such as a light guide plate, a diffusion plate and the like, a vacuum-lifting device is used for vacuum-lifting the optical element to a preset location to be machined.

BRIEF DESCRIPTION OF THE DRAWINGS

Implementations of the present technology will now be described, by way of example only, with reference to the attached figures.

DETAILED DESCRIPTION

Figure 1:
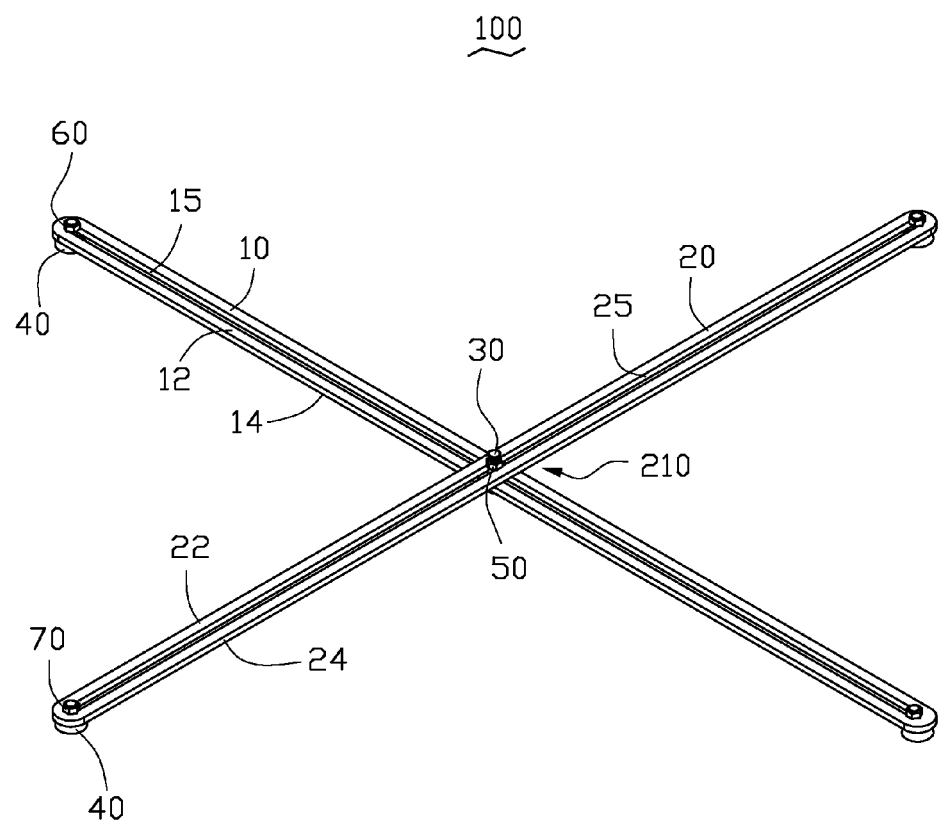
FIG. 1 is an isometric view of an embodiment of a vacuum-lifting device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to mean essentially conforming to the particular dimension, shape, or other feature that is modified such that exactness does not apply. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like. The references to "an" or "one" embodiment are not necessarily to the same embodiment, and such references mean "at least one." The references "a plurality of" and "a number of" mean "at least two."

The present disclosure is described in relation to a vacuum-lifting device. The vacuum-lifting device comprises a first slat element, a second slat element, and four suction members. The first slat element is detachably fixed on the second slat element. The first slat element intersects with the second slat element defining an intersection. The first slat element defines a first slot. The second slat element defines a second slot. Two of the four suction members are translatably secured in the first slot. The other two of the four suction members are translatably secured in the second slot.

FIG. 1 illustrates an embodiment of a vacuum-lifting device 100. The vacuum-lifting device 100 includes a first slat element 10, a second slat element 20, a connection member 30, four suction members 40, two nuts 50, two first locking members 60, and two second locking members 70.

The first slat element 10 is substantially a strip of material. The first slat element 10 includes a first upper surface 12 and a first bottom surface 14. A first slot 15 is defined lengthwise in the first slat element 10. The first slot 15 passes through the first upper surface 12 and the first bottom surface 14.

In one embodiment, the structure and the dimensions of the second slat element 20 are same as those of the first slat element 10. In detail, the second slat element 20 is also substantially a strip of material. The second slat element 20 includes a second upper surface 22 and a second bottom surface 24. A second slot 25 is defined lengthwise in the second slat element 20. The second slot 20 passes through the second upper surface 22 and the second bottom surface 24. The length, the width, and the depth of the second slot 25 are same as those of the first slot 15. The second slat element 20 intersects with the first slat element 10 defining an intersection 210. In one embodiment, the intersection 210 is located at a midpoint of the first slat element 10 and is also located at a midpoint of the second slat element 20.

Figure 2:
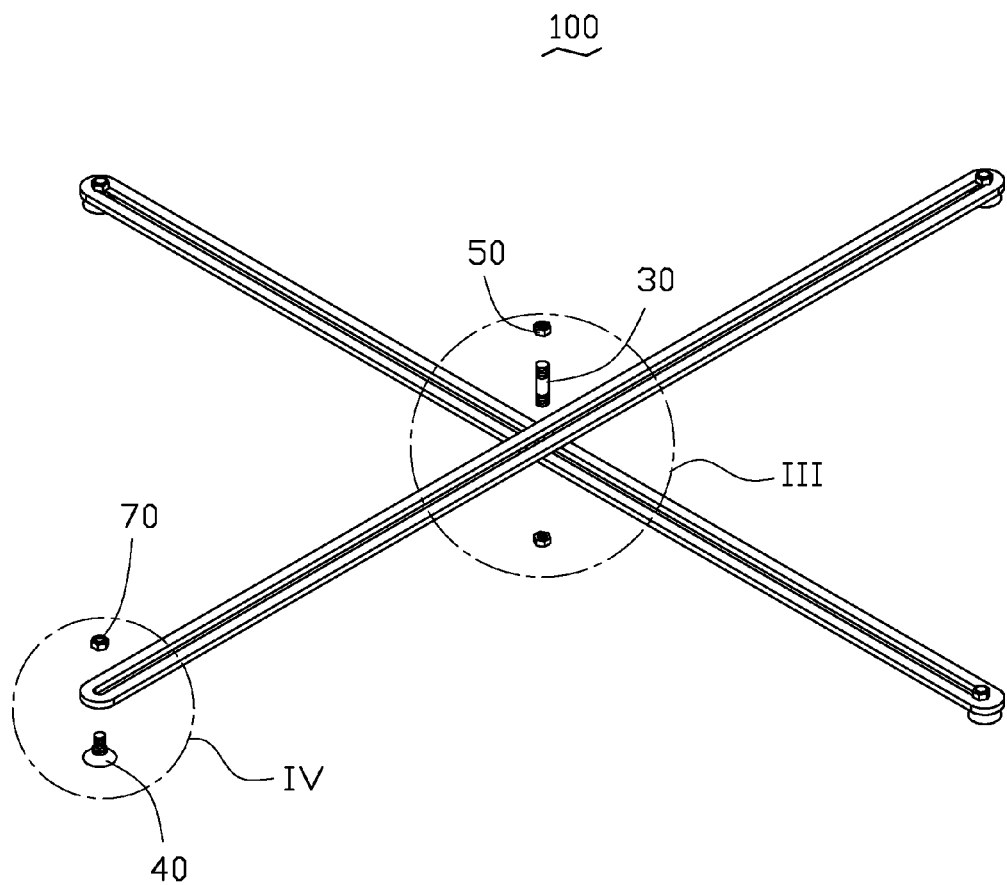
FIG. 2 is an exploded view of the vacuum-lifting device of FIG. 1.
Figure 3:
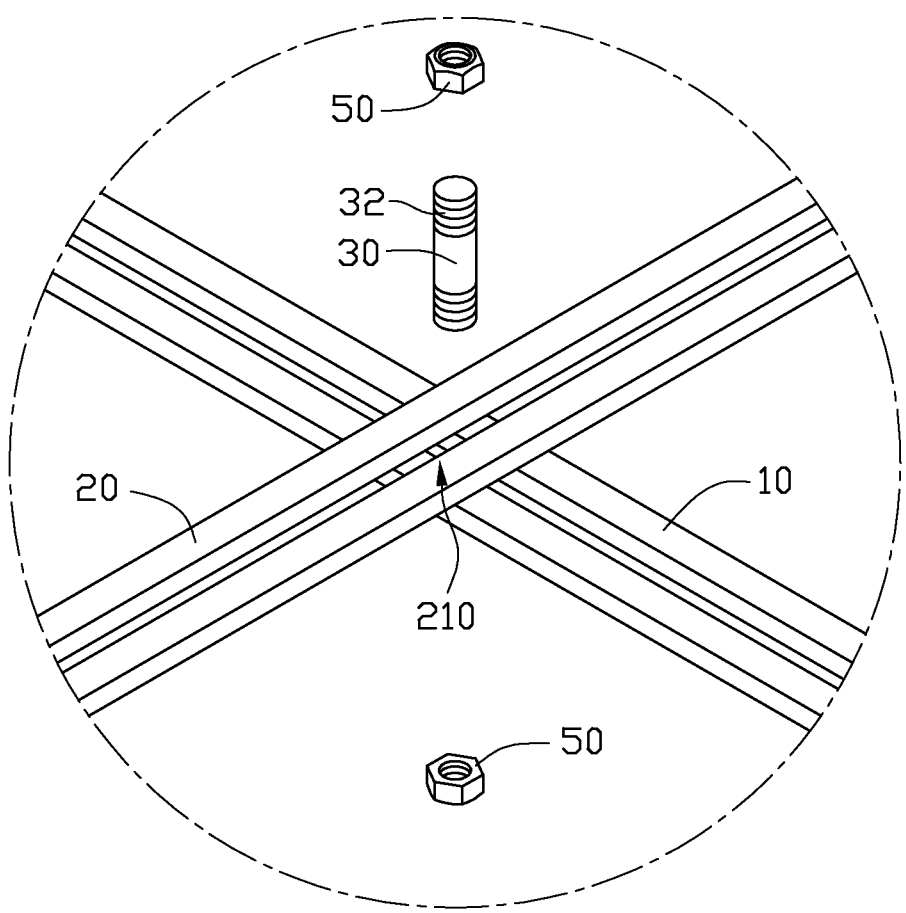
FIG. 3 is an isometric view of section III of the vacuum-lifting device of FIG. 2.

FIGS. 2 and 3 illustrate that the connection member 30 is located at the intersection 210 and extends through the first slot 15 and second slot 25. The connection member 30 is substantially a cylinder, and a diameter of the connection member 30 is small than the width of the first slot 15 and is smaller than the width of the second slot 25. Opposite ends of the connection member 30 extend out of the first slot 15 and out of the second slot 25. First screw threads 32 are defined at opposite ends of the connection member 30. The two nuts 50 engage with the first screw threads 32 on opposite ends of the connection member 30 to secure the first slat element 10 and the second slat element 20 between the two nuts 50. The two nuts 50 abut against the first bottom surface 14 and the second upper surface 22. An angle between the first slat element 10 and the second slat element 20 can be adjusted by means of rotating the first or second slat element 10 or 20 about the intersection 210 after releasing one of the two nuts 50. Also, distances between ends of the first slat element 10 or of the second slat element 20 and the intersection 210 can be adjusted by means of laterally moving the first slat element 10 or the second slat element 20 after releasing one of the two nuts 50. Tightening the released nut 50 again fixes the angle between the first slat element 10 and the second slat element 20 and the respective distances between ends of the first and second slat elements 10 and 20 and the intersection 210 are fixed.

Figure 4:
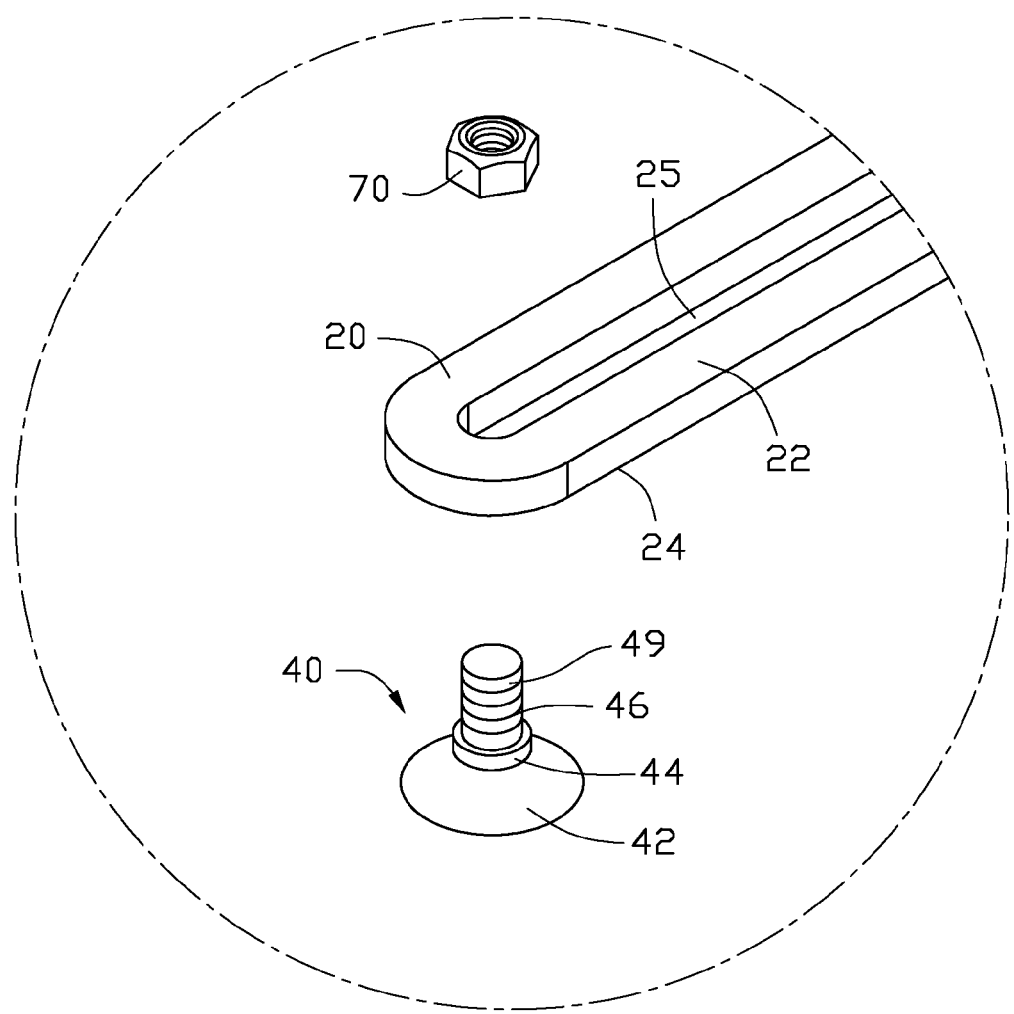
FIG. 4 is an isometric view of section IV of the vacuum-lifting device of FIG. 2.

FIGS. 2 and 4 illustrate that each suction member 40 includes a suction cup 42, a connection post 44, and a screw 46. The connection post 44 is connected between the suction cup 42 and the screw 46. The suction cup 42 is substantially a hollow truncated cone in shape. A diameter of the suction cup 42 increases along a direction away from the connection post 44. In one embodiment, the suction cup 42 is made of silica gel. The suction cup 42 is configured to vacuum-lift a workpiece. The connection post 44 and the screw 46 are substantially cylindrical. A diameter of the screw 46 is smaller than the width of the first slot 15. The diameter of the screw 46 is smaller than the width of the second slot 25. A diameter of the connection post 44 is larger than the width of the first slot 15. The diameter of the connection post 44 is larger than the width of the second slot 25. The screw 46 passes through the first slot 15 and the second slot 25. Second screw threads 49 are defined on the screw 46. The screws 46 of two of the four suction members 40 pass through the first slot 15. The second threads 49 of the two screws 46 are engaged with two first locking members 60 to secure the suction member 40 to the first slat element 10. In this situation, the two first locking members 60 abut against the first upper surface 12. The connection posts 44 of the two suction members 40 abut against the first bottom surface 14. The screws 46 of the other two of the four suction members 40 pass through the second slot 25. The second threads 49 of the other two of the four screws 46 are engaged with two second locking members 70 to secure the remaining suction members 40 to the second slat element 20. In this situation, the two second locking members 70 abut against the second upper surface 22. The connection posts 44 of the remaining suction members 40 abut against the second bottom surface 24.

FIG. 1 illustrates that two of four suction members 40 are located and secured at the two furthest ends of the first slot 15, and the remaining two of four suction members 40 are located and secured at the two furthest ends of the second slot 25, in an initial state. In this situation, the vacuum-lifting device 100 is capable of vacuum-lifting a large workpiece.

Figure 5:
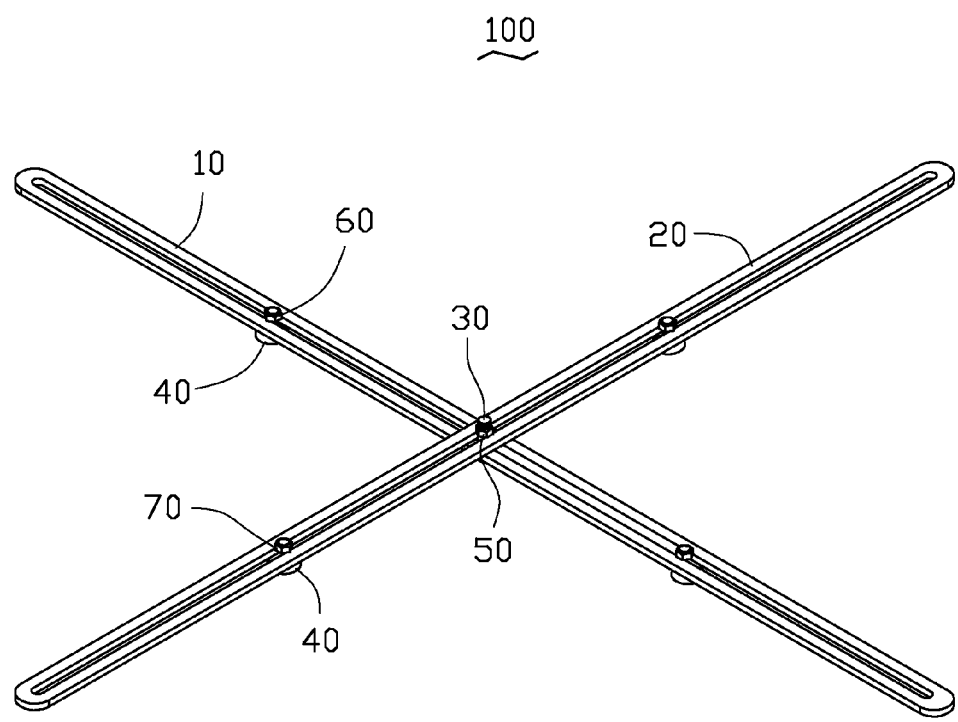
FIG. 5 is similar to FIG. 1, but showing the vacuum-lifting device in another state.

FIG. 5 illustrates the first locking members 60 and the second locking members 70 when released. Two of four suction members 40 are moved along the first slot 15 from the most remote locations of the first slot 15 toward the intersection 210, and then are re-secured to the first slat element 10. The remaining suction members 40 are moved along the second slot 25 from the most remote locations of the second slot 25 toward the intersection 210, and then are re-secured to the second slat element 20. In this situation, the vacuum-lifting device 100 is capable of vacuum-lifting a smaller workpiece.

The embodiments shown and described above are only examples. Many details are often found in the art such as the other features of a vacuum-lifting device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A vacuum-lifting device comprising:
   a first slat element, a second slat element and four suction members;
   wherein, the first slat element is detachably fixed on the second slat element, the first slat element intersects with the second slat element defining an intersection, a first slot is defined in the first slat element, a second slot is defined in the second slat element, two of the four suction members are translatably secured in the first slot, the other two of the four suction members are translatably secured in the second slot.

2. The vacuum-lifting device of claim 1, wherein respective distances between ends of the first and second slat elements and the intersection are adjustable.

3. The vacuum-lifting device of claim 2, wherein the first slat element comprises a first upper surface and a first bottom surface, the first slot is defined lengthwise in the first slat element, the first slot passes through the first upper surface and the first bottom surface, the second slat element comprises a second upper surface and a second bottom surface, the second slot is defined lengthwise in the second slat element, the second slot passes through the second upper surface and the second bottom surface.

4. The vacuum-lifting device of claim 3, further comprising a connection member and two nuts, wherein first screw threads are defined at opposite ends of the connection member, the connection member is located at the intersection and extends through the first slat element and the second slat element, opposite ends of the connection member extend out of the first and second slots respectively, the two nuts engage with the first screw threads on the opposite ends of the connection member and abut against the first bottom surface and the second upper surface respectively.

5. The vacuum-lifting device of claim 3, further comprising two first locking members and two second locking members, wherein each suction member comprises a suction cup, a connection post and a screw, the connection post is connected between the suction cup and the screw, the screws of two of the four suction members pass through the first slot and are engaged with two first locking members, the two first locking members abut against the first upper surface, the connection posts of the two suction members abut against the first bottom surface, the screws of the other two of the four suction members passes through the second slot and are engaged with the second locking members, the second locking members abut against the second upper surface, the connection posts of the remaining suction members abut against the second bottom surface.

6. The vacuum-lifting device of claim 5, wherein each suction cup is hollow truncated cone in shape, a diameter of each suction cup increases along a direction away from the connection post.

7. The vacuum-lifting device of claim 6, wherein each suction cup is made of silica gel.

8. The vacuum-lifting device of claim 1, wherein the structure and the dimensions of the second slot are same as the structure and the dimensions of the first slot.

* * * * *